April 25, 1961 D. J. NILO 2,981,285
FLUID VALVE WITH INLET AND OUTLET VALVE CAGES
Filed May 25, 1959
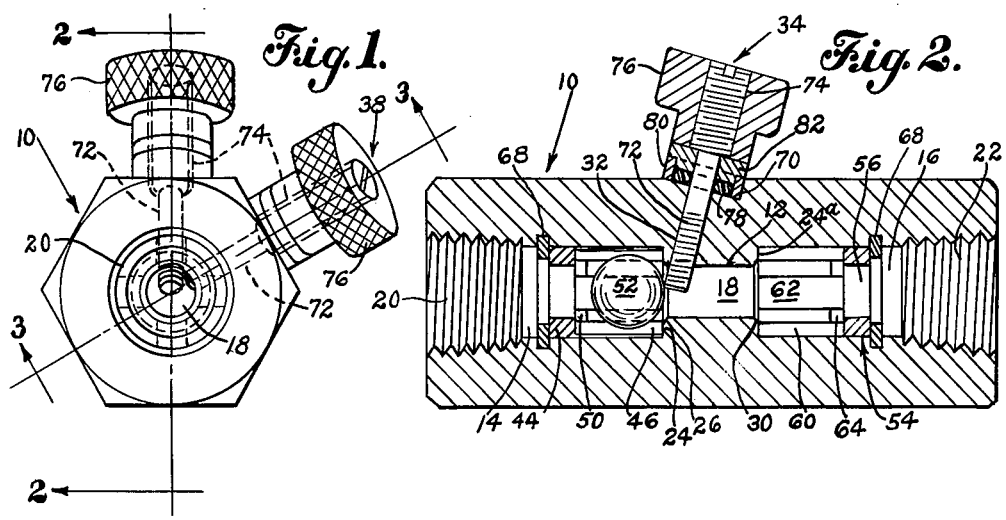
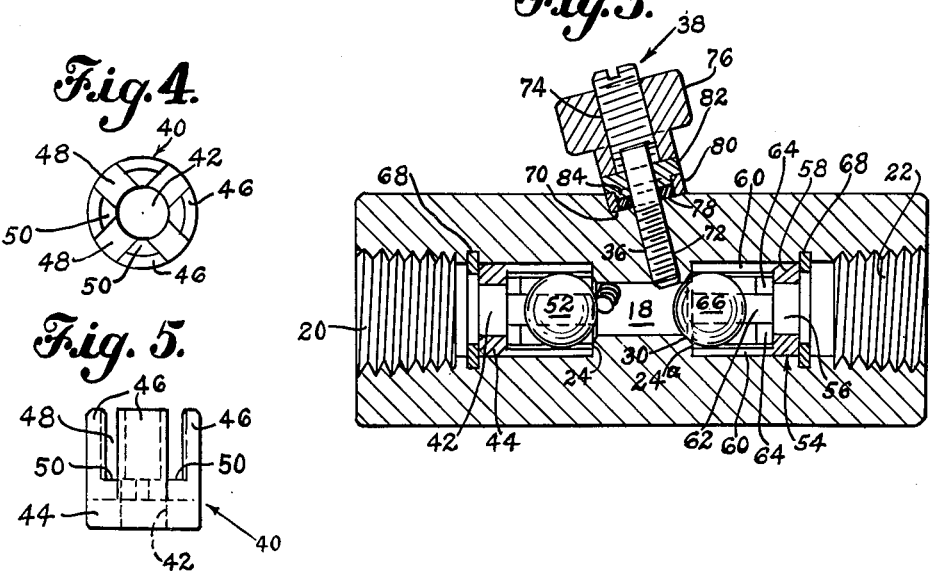
INVENTOR.
Dominick J. Nilo
BY Harold E. Cole
Attorney

United States Patent Office 2,981,285
Patented Apr. 25, 1961

2,981,285

FLUID VALVE WITH INLET AND OUTLET VALVE CAGES

Dominick J. Nilo, Somerville, Mass. (79 Bow St., Everett, Mass.), assignor of one-half to Sebastian C. Gaeta, Medford, Mass.

Filed May 25, 1959, Ser. No. 815,497

2 Claims. (Cl. 137—614.21)

This invention relates to a valve device for fluids having two valve cages each having a ball valve therein.

One object of my invention is to provide such a valve device whereby the flow of fluid can be independently controlled in two opposite directions, or the flow shut off in one direction and permitted in the other.

Another object is to provide such a valve device through which the lightest of fluids cannot leak when either ball valve is in closed position.

Another object is to provide control members for said ball valves so positioned with relation to the ball valves and the separate cages they move in, that they have the finest control over the amount of fluid passing through my device when in an open position.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claims.

In the drawing:

Fig. 1 is an end elevational view of my fluid valve device.

Fig. 2 is a sectional view taken on the line 2—2 of Fig. 1, showing the ball valve for the inlet passage maintained in an open position, the other ball valve being omitted.

Fig. 3 is a sectional view taken on the line 3—3 of Fig. 1, showing the ball valve for the outlet passage in closed position and the other ball valve in open position.

Fig. 4 is an end elevational view of a cage that retains my ball valve.

Fig. 5 is a side elevational view of said cage.

As illustrated my fluid control valve device has a unitary main body 10 having a restricted, intermediate portion 12. At one side of the latter is a passage 14 in said body and at the opposite side is another passage 16 also in said body which I refer to, for convenience, as inlet and outlet passages respectively. A restricted passage 18 through said intermediate portion 12 communicates with said passages 14 and 16. Said body 10 has screw-threads 20 at the outer end portion of said passage 14 and screw threads 22 at the outer end portion of said passage 16.

At the inlet end of said intermediate portion 12 a shoulder 24 is formed, and extending inwardly therefrom is a ball-contoured seat 26. At the outlet end thereof a shoulder 24a is formed, and extending inwardly therefrom is a ball-contoured seat 30.

A screw threaded hole 32 extends from the exterior of said intermediate portion 12 and communicates with said restricted passage 18 and a control screw 34 connects therewith and can, upon actuation, extend into said passage 18. At less than a 90-degree angle laterally to said hole 32, is another screw-threaded hole 36 that also communicates with said passage 18 and a control screw 38 connects therewith and also can extend, upon actuation, into said passage 18. Said hole 32 slants inwardly towards said inlet passage 14, while said hole 36 slants inwardly towards said outlet passage 16, the said degree of slant of each said hole being about 15 degrees from vertical.

A cage or retainer 40 extends into said inlet 14 having a passage 42 therethrough. It has a circular, solid peripheral end portion 44, four wall portions 46 extending therefrom to the opposite end of said cage which are spaced apart to provide longitudinal slots or openings 48 in said cage. The inner surfaces of said wall portions 46 are beveled, and spaced slightly from said solid end portion 44 they have shoulders 50 which provide a seat for a ball valve 52 that movably fits within said cage passage 42. This ball 52 moves towards, and may seat on, said beveled seat 26 when fluid flows from said inlet passage 14. When the flow is through said outlet passage 16, the fluid moves said ball valve 52 to said shoulders 50 which permits the fluid to flow through said slots 48 and over said wall valve 52 and out of said cage 40. Said walls 46 extend towards said restricted portion 12 and their ends bear against said shoulder portion 24 and said ball valve 52, when in closed position, rests on said contoured seat 26, in which position the valve is completely closed against any flow of fluid through said inlet passage 14.

Another cage 54 extends into said outlet passage 16 having a passage 56 therethrough. It serves the same purpose and is of the same construction as said cage 40, having a solid end portion 58, four walled portions 60 with longitudinal slots 62 separating them. The inner surfaces of said wall portions 60 are beveled, and shoulders 64 similar to shoulders 50, provide a seat for a ball valve 66 movable in said cage. When so seated it permits fluid to pass through said slots 62 and over said ball valve 66 and out of said cage 54. The ends of said walls 60 bear against said shoulder portion 24a and said ball valve 66, when in closed position, rests on said seat 30, thus closing my valves against any flow of fluid through said outlet passage 16. Arcuate retaining rings 68 fit in grooves in said inlet and outlet passages to retain said cages 40 and 54 flush against the ends of said restricted portion 12.

Since it is sometimes desirable to keep both said inlet and outlet passages open to permit the flow of fluid in either direction, while it is desirable at other times to keep one or both closed, said control screws 34 and 38 provide a perfect double control to my valve. When said screw 34 enters said intermediate or restricted passage 18, it moves and keeps said ball valve 52 away from said seat 26 and thus permits flow of fluid through from said inlet passage 14 through my valve. When said control screw 38 enters said restricted passage 18, it moves and keeps said ball valve 66 away from said seat 30 and thus permits flow of fluid from said outlet passage 16 through my valve.

When said control screws are both moved out of said restricted passage 18, said ball valves are adapted to close both inlet and outlet passages so fluid cannot pass through valve. When only one screw is moved out aforesaid then passage through the valve is closed in one direction; but passage in the other direction is permitted.

To provide a fine control of said control screws, and a locking means, I provide for each screw, in said restricted portion 12, a cut-out 70 extending diagonally inward from the exterior, communicating with a screw-threaded hole. Each said screw 34 and 38 has a screw-threaded inner end portion 72 that screw-threadedly connects with a said hole 32 or 36. Each control screw also has an outer screw-threaded portion 74 of greater diameter than said portion 72 and which screw-threadedly receives a thumb nut 76. A flexible washer 78 bears on a said body cut-out portion 70, outside of which, and enclosing it, is a metal ring 80, above which is a metal sleeve 82 having a reduced neck 84 that extends into said ring 80. Said thumb nut 76, by screw-threadedly connecting with said outer screw threaded portion 74 locks a said control screw, in any predetermined position desired when screwed onto said sleeve 82.

What I claim is:

1. A valve device comprising a body embodying a restricted, intermediate portion, said body having an inlet passage and an outlet passage and said restricted portion having a passage between and in communication with said inlet and outlet passages and having a seat at each end thereof, a cage extending into said inlet passage and another cage extending into said outlet passage, each said cage having a passage therethrough embodying a solid, peripheral outer end, a plurality of wall portions extending therefrom towards said restricted portion and spaced laterally apart, two ball valves one each movably extending into each said cage and adapted to seat on said restricted portion seats when in closed position, said cage wall portions having a seat spaced from said solid outer end, said ball valves adapted to seat on said latter seats and thereby permit fluid to flow over said ball valves and into said spaces between said walls and beyond said cage, said restricted portion having two screw-threaded openings extending from the exterior thereof and communicating with said restricted portion passage, and two control screws one each of which extends into and screw-threadedly connects with a said restricted portion opening and adapted, upon being moved to closed position, to enter said restricted portion passage and contact a said ball valve and move it away from a said restricted portion seat, one said control screw extending diagonally inward towards said inlet passage and the other control screw extending diagonally inward towards said outlet passage.

2. A valve device comprising a body embodying a restricted, intermediate portion, said body having an inlet passage and an outlet passage and said restricted portion having a passage between and in communication with said inlet and outlet passages and having a seat at each end thereof, a cage extending into said inlet passage and another cage extending into said outlet passage, each said cage having a passage therethrough embodying a solid, peripheral outer end, a plurality of wall portions extending therefrom towards said restricted portion and spaced laterally apart, two ball valves one each movably extending into each said cage and adapted to seat on said restricted portion seats when in closed position, said cage wall portions having a seat spaced from said solid outer end, said ball valves adapted to seat on said latter seats and thereby permit fluid to flow over said ball valves and into said spaces between said walls and beyond said cage, said restricted portion having two screw-threaded openings extending from the exterior thereof and communicating with said restricted portion passage, and two control screws one each of which extends into and screw-threadedly connects with a said restricted portion opening and adapted, upon being moved to closed position, to enter said restricted portion passage and contact a said ball valve and move it away from a said restricted portion seat, one said control screw extending diagonally inward towards said inlet passage and the other control screw extending diagonally inward towards said outlet passage, said control screws being positioned laterally, relative to each other, in said openings at an angle of less than 90 degrees between them.

References Cited in the file of this patent

UNITED STATES PATENTS

| 1,165,230 | Degen | Dec. 21, 1915 |
| 1,915,553 | Shindel | June 27, 1933 |
| 2,344,354 | Hallerstrom et al. | Mar. 14, 1944 |
| 2,800,142 | Champion | July 23, 1957 |

FOREIGN PATENTS

| 197,057 | Switzerland | July 1, 1938 |